(12) United States Patent
Paley et al.

(10) Patent No.: US 7,389,397 B2
(45) Date of Patent: Jun. 17, 2008

(54) METHOD OF STORING CONTROL INFORMATION IN A LARGE-PAGE FLASH MEMORY DEVICE

(75) Inventors: Alexander Paley, Kfar Saba (IL); Menahem Lasser, Kohav Yair (IL)

(73) Assignee: Sandisk IL Ltd, Kfar Saba (IL)

( * ) Notice: Subject to any disclaimer, the term of this patent is extended or adjusted under 35 U.S.C. 154(b) by 195 days.

(21) Appl. No.: 11/438,395

(22) Filed: May 23, 2006

(65) Prior Publication Data

US 2006/0277388 A1 Dec. 7, 2006

Related U.S. Application Data

(60) Provisional application No. 60/686,012, filed on Jun. 1, 2005.

(51) Int. Cl.
*G06F 12/00* (2006.01)

(52) U.S. Cl. ............... 711/170; 711/103; 711/111; 711/171; 711/173

(58) Field of Classification Search ............ 711/103, 711/111, 170, 171, 173
See application file for complete search history.

(56) References Cited

U.S. PATENT DOCUMENTS

| | | | |
|---|---|---|---|
| 5,404,485 A | 4/1995 | Ban | |
| 5,742,934 A * | 4/1998 | Shinohara | 711/103 |
| 5,822,781 A * | 10/1998 | Wells et al. | 711/171 |
| 5,937,425 A | 8/1999 | Ban | |
| 6,591,330 B2 | 7/2003 | Lasser | |
| 6,678,785 B2 | 1/2004 | Lasser | |
| 6,684,289 B1 | 1/2004 | Gonzalez et al. | |
| 6,760,805 B2 | 7/2004 | Lasser | |
| 2005/0021904 A1* | 1/2005 | Iaculo et al. | 711/103 |
| 2005/0132126 A1* | 6/2005 | Lin et al. | 711/103 |
| 2005/0132129 A1* | 6/2005 | Venkiteswaran | 711/103 |

OTHER PUBLICATIONS

U.S. Appl. No. 11/113,148, filed Jul. 2006, Lasser.
Toshiba's Large-Page Flash Device TC58NVG1S3BFT00 (refer to p. 33 of datasheet), 2003.

* cited by examiner

*Primary Examiner*—Jack A Lane
(74) *Attorney, Agent, or Firm*—Mark M. Friedman

(57) ABSTRACT

A memory for storing user data includes one or more units. Each unit has one or more pages, each with sufficient storage space for storing both several sectors of user data and related overhead data. The storage space of at least one page per unit is partitioned among user data areas (one per sector) and one or more unit field areas. Each unit field area includes at least one unit field, and the storage space includes fewer of at least one of the unit fields than there are sectors. When unit data are stored in the unit field area, there are fewer instances of at least one unit datum than there are sectors. The storage space also includes one sector field area per sector and one sector data field area per sector, and the size of the storage space is less than the sum of the area sizes times the number of sectors.

31 Claims, 13 Drawing Sheets

| 210A | 230A | 250A | 270A | 220A | 240A | 260A | 280A |
|---|---|---|---|---|---|---|---|
| 0 | 511\|512 | 1023\|1024 | 1535\|1536 | 2047 | 2063 | 2079 | 2095 | 2111 |

Figure 3

| Unit fields (8 bytes) | Sector 1 page fields (4 bytes) | Sector 2 page fields (4 bytes) | Sector 3 page fields (4 bytes) | Sector 4 page fields (4 bytes) | Sector 1 data (512 bytes) | Sector 1 ECC (10 bytes) | Sector 2 data (512 bytes) | Sector 1 ECC (10 bytes) | Sector 3 data (512 bytes) | Sector 1 ECC (10 bytes) | Sector 4 data (512 bytes) | Sector 1 ECC (10 bytes) |
|---|---|---|---|---|---|---|---|---|---|---|---|---|

Figure 6

| Unit fields (8 bytes) | Sector 1 page fields (4 bytes) | Sector 2 page fields (4 bytes) | Sector 3 page fields (4 bytes) | Sector 4 page fields (4 bytes) | Sector 1 data (512 bytes) | Sector 2 data (512 bytes) | Sector 3 data (512 bytes) | Sector 4 data (512 bytes) |
|---|---|---|---|---|---|---|---|---|

Figure 12

METHOD OF STORING CONTROL INFORMATION IN A LARGE-PAGE FLASH MEMORY DEVICE

This patent application claims the benefit of U.S. Provisional Patent Application No. 60/686,012, filed Jun. 1, 2005

FIELD AND BACKGROUND OF THE INVENTION

The present invention relates to flash memories and, more particularly, to a method of improving the performance of a flash memory in which multiple sectors of data are stored per page.

Flash devices are electrically erasable and programmable read-only memories (EEPROMs) made of flash-type, floating-gate transistors and are non-volatile memories similar in function and performance to EPROM memories, with an additional function that allows an in-circuit, programmable operation to erase portions of the memory. Flash devices have the advantage of being relatively inexpensive and requiring relatively little power as compared to traditional magnetic storage disks. However, flash devices have certain limitations that make using them at the physical address level a bit of a problem. In a flash device, it is not practical to rewrite a previously written area of the memory without a prior erase of the area, i.e. flash cells must be erased (e.g. programmed to "one") before they can be programmed again. Erasing can only be done for relatively large groups of cells usually called "erase blocks" (typically of size 16 to 256 Kbytes in current commercial NAND devices, and of larger size in NOR devices). Therefore updating the contents of a single byte or even of a chunk of 1 kilobytes requires "housekeeping" operations—parts of the erase block that are not updated must first be moved elsewhere so they will be preserved during erasing, and then moved back into place.

Furthermore, some of the blocks of the device are "bad blocks" that are not reliable so that their use should be avoided. Blocks are declared as "bad blocks" either by the manufacturer when initially testing the device or by application software when detecting the failure of the blocks during use of the device in the field.

To overcome these limitations of the background art, a Flash File System (FFS) was disclosed in U.S. Pat. No. 5,404,485 to Ban, which is assigned to the assignee of the present application and which is hereby incorporated by reference as if fully set forth herein. FFS provides a system of data storage and manipulation on flash devices that allows these devices to emulate magnetic disks. In the existing art, applications or operating systems generally interact with the flash storage subsystem not using physical addresses but rather virtual addresses. There is an intermediary layer between the software application and the physical device that provides a mapping from the virtual addresses into the physical addresses. While the software may view the storage system as having a contiguous defect-free medium that can be read or written randomly with no limitations, the physical addressing scheme has "holes" in its address range (due to the bad blocks, for example), and pieces of data that are adjacent to each other in the virtual address range might be greatly separated in the physical address range. The intermediary layer that does the mapping described above may be a software driver running on the same CPU on which the applications run. Alternatively, the intermediary layer may be embedded within a controller that controls the flash device and serves as the interface point for the main CPU of the host computer when the host computer accesses the storage. This is for example the situation in removable memory cards such as secure digital (SD) cards or multimedia cards (MMC), where the card has an on-board controller running a firmware program that, among other functions, implements the type of mapping described above.

Software or firmware implementations doing such address mappings are typically called "flash management systems" or "flash file systems". The latter term is a misnomer, as the implementations do not necessarily support "files", in the sense that files are used in operating systems of personal computers, but rather support block device interfaces similar to those exported by hard disk software drivers. Still, the term is commonly used, and the terms "flash file system" and "flash management system" are used herein interchangeably.

Other prior art systems that implement virtual-to-physical address mapping can be found in U.S. Pat. No. 5,937,425 to Ban and U.S. Pat. No. 6,591,330 to Lasser, both of which are incorporated by reference for all purposes as if fully set forth herein.

In U.S. Pat. No. 5,937,425, which is particularly suitable for NAND-type flash devices, the mapping is done as follows, referring to FIG. 1 (prior art). Physical address space 13 is composed of physical units 111 that are actually the erase blocks i.e. the smallest chunks that can be erased. Each physical unit 111 contains one or more physical pages 113, where a page is the smallest chunk that can be written. A virtual address space 11 is composed of virtual units 121 that have the same size as the physical units. Each virtual unit contains one or more virtual pages 123, having the same size as physical pages 113. When a virtual address is provided by an application, for reading or writing, the virtual unit number to which that address belongs is extracted from the virtual address. There is a mapping that assigns to each virtual unit 121 either one physical unit 111 or a chain of more than one physical unit 111. Then physical page 113 corresponding to requested virtual page 123 within virtual unit 121 is located within the corresponding physical unit(s) 111, using a "local" mapping rule that relates virtual pages 123 to physical pages 113, or using control information stored with physical pages 113.

One of the advantages of the methods disclosed in U.S. Pat. No. 5,937,425 is that as the main mapping is done over units rather than pages, the translation tables are much smaller than they would be otherwise, as there are many fewer units than pages. Another advantage is the write performance improvement that results from being able to assign more than one physical unit 111 to one virtual unit 121.

In order for a flash management system to implement the mapping of virtual to physical addresses, it is necessary to associate and store some control information (also called "overhead data" or "metadata") with the pages and units of the storage system. Even if the flash management system performs its address mappings using translation tables fully kept in RAM, it would still need to store some control information in non-volatile storage, as otherwise the flash management system would not be able to create and initialize its tables when starting up again after a power-down. Therefore all flash management systems write some control fields into the flash memory in addition to the user data stored within the system.

Because of this, all NAND flash devices are manufactured in advance with extra bytes of storage attached to each page. Typically the amount of extra space provided is 16 bytes per 512 bytes of user data space. This "extra area" (or "spare area") forms an integral part of the page and both the extra area and user data can be written together in a single write operation. The extra area is used by most NAND-type flash management systems for storing whatever control information they need to keep and then retrieve, either during regular operation or at power-up.

The information fields stored in the extra area can be classified into several categories. A good example for the use of such different categories can be seen in U.S. Pat. No. 6,684,289 to Gonzalez et al. (see for example FIG. 10). Note that Gonzalez et al. actually discloses an atypical flash management system that separates the storage of user data from the storage of some of the control information associated with it, unlike what was explained above. Still, Gonzalez et al. is a good example for understanding the different categories of control fields.

The categories of control fields are:

(a) Fields associated with the specific contents of a page. By that we mean the field's value changes if the user data changes. The best (and usually the only) example of such a field is an Error Correction Code (ECC) field, storing parity bits that support the correction of errors in the data. We refer to such fields herein as "page data fields" or (see the discussion below about sectors) "sector data fields".

(b) Fields associated with a page, but not with the specific data the page contains. One example for such a field is a flag indicating whether the data in the page were deleted by the user and are no longer valid. Another example is a field identifying a portion of the virtual address to which the page belongs. See for example U.S. Pat. No. 6,678,785 to Lasser, in which the disclosed flash management system associates and stores with each page a field identifying the virtual page number within the virtual unit number to which the page corresponds. We refer to such fields herein as "page fields" or (see the discussion below about sectors) "sector fields".

(c) Fields associated with a complete unit rather than with a single page. One example of such field is a flag indicating whether the unit is currently in use. Another example is a field providing the virtual unit number to which the unit corresponds. Such fields are referred to herein as "unit fields".

The page data fields and page fields are required for each page. However, unit fields need not be stored with each page but only once per unit. Typically flash management systems store the unit fields in the first page of a unit, sometimes duplicating them in another page for improving reliability. Therefore the total amount of space required for control information per page is the sum of the amounts required for the page data fields, the page fields and the unit fields. This is so even though in most cases, in all pages except the first page of the unit, at least the part of the extra area corresponding to the unit fields is not used.

The amount of extra area available for control information is limited. Typically for NAND flash devices having pages of 512 bytes each, the extra area is 16 bytes per page. Flash management systems must work within this constraint. A trade-off of design goals is necessary so as not to exceed the available extra area. For example, a system design may allocate 6 bytes for ECC bits, leaving 10 bytes for supporting its management algorithms. Or a different system design may allocate 8 bytes for ECC bits, providing for a higher number of errors that can be corrected and consequently achieving a better system reliability. But in this case only 8 bytes are left for supporting the management algorithms, and this might result in more complex and possibly less efficient management algorithms.

Even though it would thus seem advantageous to have flash devices with a larger extra area, flash manufacturers do not generally follow this path because a larger extra area means a more expensive device. Extra area bits consume silicon area exactly as user data bits do, and therefore the larger the extra area the larger the consumed silicon area. Therefore minimizing extra area is highly desirable.

Consequently for any given flash management system, each one of the following goals are desirable:

(a) Reduce the amount of extra area bytes that need to be provided per page. This goal applies to the design of new flash devices, in which it is possible to deviate from the 16-bytes value currently used.

(b) For existing devices with an extra area of 16 bytes, provide as much space as possible for ECC so as to allow better reliability, without compromising management algorithms complexity and efficiency by supporting all control fields as in the prior art.

(c) For existing devices with a given extra area of 16 bytes, keep the ECC field the same size and provide room for more control fields for management algorithms so as to achieve less complex and more efficient flash management.

One class of flash management systems to which the current invention is especially applicable is the class of systems managing flash devices having pages larger than 512 bytes. Typical file systems and operating systems handle user data in chunks called "sectors" that are 512-bytes long. This is the unit of data exchanged between the file system and the storage system in practically all personal computers, including those employing Microsoft DOS or Windows operating systems. Until quite recently most NAND flash devices had a page size of 512 bytes, so there was a natural matching between user data sectors and flash device pages. A sector of user data that is provided to the flash management system to be stored, is written into a single page together with its related control fields. The flash management system has 16 bytes of extra area available for those control fields, as explained above.

Recently however many flash devices with a page size of 2 Kbytes have been introduced into the market. Such devices are preferred by flash manufacturers for high capacities because the larger pages consume less silicon area for the same number of storage bits, and also because such devices have better read/write performance as a larger number of bytes is read or written in parallel. Flash management systems have been adapted to be able to manage such devices, herein called "large-page devices". An example of such a flash management system capable of handling large-page devices is disclosed in U.S. Pat. No. 6,760,805 to Lasser, which is incorporated by reference for all purposes as if fully set forth herein.

These prior art flash management systems handle large-page devices by allocating multiple user data sectors to a single flash page. We use as an example large pages that are 2 Kbytes as this size is the most common in commercially available large-page NAND flash devices, but other page sizes are also possible and may also benefit from the methods of the present invention. A page of 2 Kbytes can contain four times 512 bytes, and therefore is assigned to contain four user data sectors. In addition to the user data space, a large page contains an extra area of 64 bytes, 64 being four times the 16 bytes extra area of the small-page devices. This makes each large page have a size of 2112 bytes.

Some terminology clarification is required here. As stated above, in the past, flash memory pages contained 512 bytes of user data, or in other words a single data sector. This caused a one-to-one match between pages and sectors. Therefore, even though strictly speaking fields associated with the user's data should have been called "sector data fields" and "sector fields", they were called above "page data fields" and "page fields". When discussing large-page flash memories the one-to-one correspondence between pages and sectors is no longer valid as a page corresponds to multiple sectors. Therefore the sector-based terminology is the more appropriate. However, in order to be consistent with prior art, we retain the page-based terminology. To summarize, in the present disclosure and in the appended claims:

a. the terms "page data field" and "sector data field" are synonyms and mean a field associated with the specific contents of a sector of data;

b. the terms "page field" and "sector field" are synonyms and mean a field associated with a sector, but not with the specific data the sector contains.

Some prior art systems write the four sectors sequentially into their joint page, each sector data adjacent to its control area. This is shown in FIG. 2, in which the location of the four sectors and their control information within the page is illustrated. Area 210 occupies bytes 0 to 511 and contains user data of the first sector. Area 220 occupies bytes 512 to 527 and contains the control information of the first sector. Area 230 occupies bytes 528 to 1039 and contains user data of the second sector. Area 240 occupies bytes 1040 to 1055 and contains the control information of the second sector. Area 250 occupies bytes 1056 to 1567 and contains user data of the third sector. Area 260 occupies bytes 1568 to 1583 and contains the control information of the third sector. Area 270 occupies bytes 1584 to 2095 and contains user data of the fourth sector. Area 280 occupies bytes 2096 to 2111 and contains the control information of the fourth sector.

Other prior art systems do not put a sector and its related control information adjacent to each other, but group the control information of all four sectors of a page together. This is shown in FIG. 3, which is the equivalent of FIG. 2 for the case of all the page's control fields grouped together. Area 210A is the equivalent of area 210 and occupies bytes 0 to 511. Area 230A is the equivalent of area 230 and occupies bytes 512 to 1023. Area 250A is the equivalent of area 250 and occupies bytes 1024 to 1535. Area 270A is the equivalent of area 270 and occupies bytes 1536 to 2047. Area 220A is the equivalent of area 220 and occupies bytes 2048 to 2063. Area 240A is the equivalent of area 240 and occupies bytes 2064 to 2079. Area 260A is the equivalent of area 260 and occupies bytes 2080 to 2095. Area 280A is the equivalent of area 280 and occupies bytes 2096 to 2111.

The datasheet of Toshiba's large-page flash device TC58NVG1S3BFT00 also implies such an arrangement (see page 33 in the datasheet)—even though it does not explicitly address the question of where to locate control information within the page, the way the partial page programming segments are arranged implies this is what the device designers had in mind.

FIG. 4 shows a typical structure of the control fields stored in areas 220, 220A, 240, 240A, 260, 260A, 280 and 280A. Each control area is 16 bytes long and has room for 6 bytes of page data fields (typically ECC), 8 bytes of unit fields and 2 bytes of page fields. It should be noted, however, that not all fields are actually in use in this arrangement. While ECC bytes and page fields' bytes are used for every sector within the page and every page within the unit, unit fields' bytes are not always used. Assuming no redundant copies of unit fields are kept, typically only the first sector of the first page of a unit makes use of its unit fields' space. For all other sectors, these bytes remain unused in prior art flash management systems.

It is mainly for this type of flash management systems that manage large-page devices that the methods of the present invention are applicable.

SUMMARY OF THE INVENTION

According to the present invention there is provided a method of managing storage of user data in a memory, including the steps of: (a) providing the memory with at least one unit having at least one page with sufficient storage space to store both a plurality of sectors of the user data and overhead data related to the sectors; and (b) for at least one page, partitioning the storage space among: (i) for each sector, a corresponding user data area, and (ii) at least one unit field area, each unit field area including at least one unit field, for at least one unit field there being, in the partitioned storage space, fewer instances of the one unit field than the user data areas.

According to the present invention there is provided a method of managing storage of user data in a memory, including the steps of: (a) providing the memory with at least one unit having at least one page with sufficient storage space to store both a plurality of sectors of the user data and overhead data related to the sectors; and (b) for at least one page: (i) including in the overhead data, of the sectors that are stored in each such page, at least one unit datum, and (ii) storing the at least one unit datum in the storage space of the page, there being fewer instances of at least one of the at least one unit datum stored in the storage space of the page than there are sectors in the page.

According to the present invention there is provided a method of managing storage of user data in a memory, including the steps of: (a) providing the memory with at least one unit having at least one page with sufficient storage space to store both a plurality of sectors of the user data and overhead data related to the sectors; and (b) for at least one page, partitioning the storage space of the page among: (i) for each sector of the page, a corresponding user data area, all the user data areas having a common user data area size, (ii) for each sector of the page, a corresponding sector field area, all the sector field areas having a common sector field area size, (iii) for each sector of the page, a corresponding sector data field area, all the sector data field areas having a common sector data field area size, and (iv) at least one unit field area having a unit field area size; wherein a size of the storage space of the page is less than a product of a number of the sectors of the page with a sum of the sizes.

According to the present invention there is provided a method of managing storage of user data in a memory, comprising the steps of: (a) providing the memory with at least one unit having at least one page with sufficient storage space to store both a plurality of sectors of the user data and overhead data related to the sectors; and (b) for at least one page, partitioning the storage space of the page among: (i) for each sector of the page, a corresponding user data area, all the user data areas having a common user data area size, (ii) for each sector of the page, a corresponding sector field area, all the sector field areas having a common sector field area size, and (iii) at least one unit field area having a unit field area size; wherein a size of the storage space of the page is less than a product of a number of the sectors of the page with a sum of the sizes.

The present invention is a method of managing the storage of user data in a memory. According to a first basic embodiment of the method, the memory is provided with one or more units, each unit having one or more pages with sufficient space, for example enough cells of a so-called Single Level Cell flash memory that stores one bit per cell, to store both a plurality of sectors of the user data and also overhead data related to the sectors. The storage space of one or more of the pages of each unit, but not necessarily of all of the pages of each unit, is partitioned among user data areas, one user data area per sector, and one or more unit field areas. Each unit field area includes at least one unit field, but for at least one unit field there are fewer instances of that unit field in the storage space than there are sectors in the plurality of sectors.

The unit field area or areas need not be internally contiguous. Different unit fields of the same unit field area may be located in separate places in the storage space.

Preferably, the condition of there being fewer unit field instances than sectors applies to all the unit fields.

Preferably, the storage space includes only one unit field area.

Preferably, the storage space also includes, for each sector, a corresponding sector field area. Like the unit field area(s), the sector field areas are not necessarily internally contiguous: different sector fields of the same sector field area may be located in separate places in the storage space. Most preferably, the sector field areas are interleaved with the user data areas. Alternatively, the sector field areas are contiguous with each other.

More preferably, the storage space also includes, for each sector, a corresponding sector data field area. Typically, the sector data field areas are used for storing error correction codes. Most preferably, the sector field areas and the sector data field areas are interleaved with the user data areas. Alternatively, the sector field areas are contiguous with each other and the sector data field areas are interleaved with the user data areas. As another alternative, the sector field areas and the sector data field areas are contiguous with each other. In the latter case, the sector field areas and the sector data field areas may be interleaved among each other, as illustrated in FIG. 7 below.

Preferably, at least one of the units has a plurality of pages, and the storage space of some but not all of the pages is partitioned to have one or more unit field areas as described above, although the storage space that is not partitioned to have one or more unit field areas nevertheless typically is partitioned among user data areas as described above. Most preferably, the storage space of only one page per such unit is partitioned to have one or more unit field areas.

According to a second basic embodiment of the method of the present invention, the memory is provided with one or more units, each unit having one or more pages with sufficient space to store both a plurality of sectors of the user data and also overhead data related to the sectors. For one or more of the pages of each unit, but not necessarily for all the pages of each unit, the overhead data of the sectors of user data stored in those pages includes at least one unit datum. Note that the unit data are considered to be related to those sectors of user data because they describe, or relate to, the unit in which the sectors of user data are stored. For at least one of the unit data, fewer instances of that unit datum are stored in the storage space of the pages whose overhead data include one or more unit data, than there are sectors in the pluralities of sectors of those pages.

Preferably, fewer instances of all the unit data are stored in the storage space than there are sectors in the plurality of sectors. Most preferably, only one instance of each unit datum is stored in the storage space.

Preferably, at least one of the units has a plurality of pages. The overhead data of the sectors of unit data stored in only some but not all of those pages includes the one or more unit data, fewer instances of which are stored in the storage space of those pages than there are sectors in the pluralities of sectors of those pages. Most preferably, the overhead data of only one page per such unit includes the one or more unit data, fewer instances of which are stored in the storage space of that page than there are sectors in the plurality of sectors of that page.

According to a third basic embodiment of the method of the present invention, the memory is provided with one or more units, each unit having one or more pages with sufficient space to store both a plurality of sectors of the user data and also overhead data related to the sectors. The storage space of one or more of the pages of each unit, but not necessarily of all of the pages of each unit, is partitioned among user data areas, sector field areas, sector data field areas and one or more unit field areas. For each sector, there is a corresponding user data area, a corresponding sector field area and a corresponding sector data field area. All the user data areas have the same size. All the sector field areas have the same size. All the sector data field areas have the same size. The unit field area, or the combination of all the unit field areas if there is more than one unit field area, also has a certain size. The total size of the storage space is less than the sum of the various sizes, multiplied by the number of sectors. For example, with 512-byte user data areas, 2-byte page field areas, 6-byte page data field areas and a 16-byte unit field area, the total size of storage space for storing four sectors and the associated overhead data is less than 4×(512+2+6+16)=2144 bytes.

Preferably, at least one of the units has a plurality of pages, and the storage space of not all of the pages is partitioned to have one or more unit field areas as described above, although the storage space that is not partitioned to have one or more unit field areas nevertheless typically is partitioned among user data areas, sector field areas and sector data field areas as described above. Most preferably, the storage space of only one page per such unit is partitioned to have one or more unit field areas.

According to a fourth basic embodiment of the method of the present invention, the memory is provided with one or more units, each unit having one or more pages with sufficient space to store both a plurality of sectors of the user data and also overhead data related to the sectors. The storage space of one or more of the pages of each unit, but not necessarily of all of the pages of each unit, is partitioned among user data areas, sector field areas and one or more unit field areas. For each sector, there is a corresponding user data area and a corresponding sector field area. All the user data areas have the same size. All the sector field areas have the same size. The unit field area, or the combination of all the unit field areas if there is more than one unit field area, also has a certain size. The total size of the storage space is less than the sum of the various sizes, multiplied by the number of sectors. For example, with 512-byte user data areas, 2-byte page field areas and a 16-byte unit field area, the total size of storage space for storing four sectors and the associated overhead data is less than 4×(512+2+16)=2120 bytes.

Preferably, at least one of the units has a plurality of pages, and the storage space of not all of the pages is partitioned to have one or more unit field areas as described above, although the storage space that is not partitioned to have one or more unit field areas nevertheless typically is partitioned among user data areas and sector field areas as described above. Most preferably, the storage space of only one page per such unit is partitioned to have one or more unit field areas.

The scope of the present invention also extends to a memory device that includes a memory and a controller for managing storage of user data in the memory according to the principles of the present invention. The scope of the present invention also extends to a system, for storing data, that includes a memory device and a processor that is operative to manage storage of user data in the memory device according to the principles of the present invention.

BRIEF DESCRIPTION OF THE DRAWINGS

The invention is herein described, by way of example only, with reference to the accompanying drawings, wherein:

FIGS. 2 and 3 illustrate the storage of user data and control information according to the prior art;

FIGS. 5-7 and 10-13 illustrate the storage of user data and control information according to the present invention;

DESCRIPTION OF THE PREFERRED EMBODIMENTS

The present invention is of a method of efficient storage of control bytes in flash memory. Specifically, the present invention can be used to efficiently store control bits in flash memories that store multiple data sectors per page.

The principles and operation of control byte storage according to the present invention may be better understood with reference to the drawings and the accompanying description.

The methods of the present invention are directed towards providing a more efficient use of the control bytes of a flash page. Considerations related to the size of various types of control fields are presented in US patent application Ser. No. 11/113,148, which is incorporated by reference for all purposes as if fully set forth herein. By using these methods it is possible to achieve one or more of the following advantages:

(a) For the same flash memories as in prior art systems, allocating more bytes to the ECC field. This allows stronger error correction schemes to be employed, capable of correcting more errors per sector, thus improving the memory system's reliability.

(b) For the same flash memories as in the prior art systems, allocating more bytes to flash management control fields. This allows faster and more efficient flash management algorithms.

(c) When designing new flash memories, providing fewer control bytes per page, while still providing the same number of bytes for ECC fields and for flash management control fields as in prior art systems. This allows the implementation of flash memory systems that are as reliable and as efficient as prior art systems, while being less costly to manufacture due to the smaller silicon area required for each page.

Figure 4:
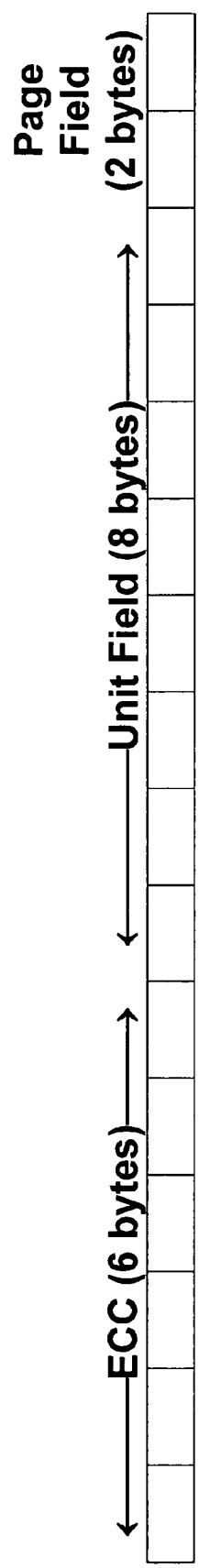
FIG. 4 shows the structure of the control fields o FIGS. 2 and 3.
Figure 5:
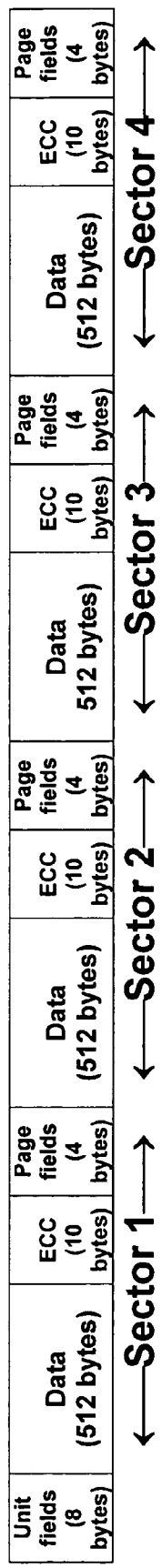

A first embodiment of the present invention is illustrated in FIG. 5. Here, space for the unit fields is not associated with any specific sector but with the page as a whole. However, for every sector, the user data, the ECC and the page fields are grouped together and are adjacent to each other. Even though the page size in FIG. 5 is exactly the same as the page size in FIG. 2 and in FIG. 3 (in all cases 2112 bytes), the sizes of the fields that can be stored within the page is larger. Each of the four sets of ECC fields in FIG. 5 is 10 bytes long, compared to 6 bytes in FIG. 4, which provides the fields' sizes for FIGS. 2 and 3. Each of the four sets of page fields in FIG. 5 is 4 bytes long, compared to 2 bytes in FIG. 4. There are 8 bytes of unit fields in FIG. 5, the same as in FIG. 4.

It is thus possible to get both better reliability (larger ECC) and better flash management (larger page fields) while still using the same flash memories as used in prior art systems.

A second embodiment of the present invention is illustrated in FIG. 6. Here not only the unit fields are not adjacent to the sectors' data, but also the page fields are not adjacent to their respective sectors but are grouped together at the beginning of the page, following the unit fields. Only the ECC bytes remain adjacent to their corresponding sectors. The sizes of fields in this embodiment is exactly the same as in the embodiment of FIG. 5, in spite of the different structure. Each set of ECC fields is 10 bytes long, each set of page fields is 4 bytes long, and the unit fields are 8 bytes long. This points out the fact it is not the relative order of the various fields that counts, and different orders can provide exactly the same field sizes and therefore exactly the same advantages.

Figure 7:
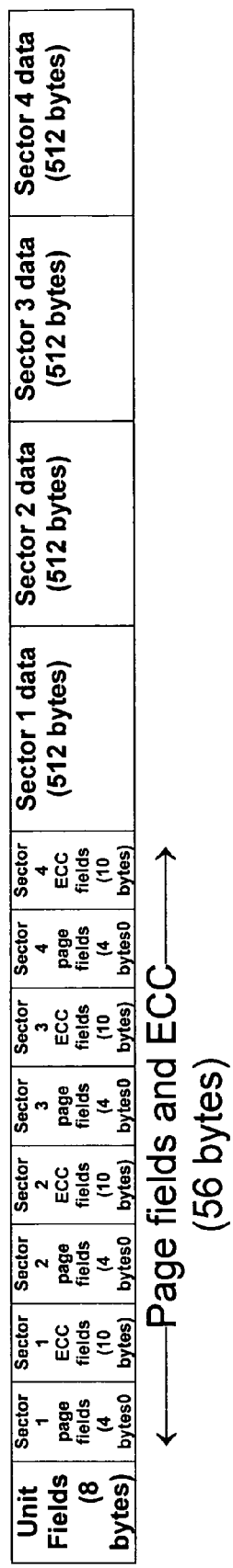

A third embodiment of the present invention is illustrated in FIG. 7. Here no control fields are put adjacent to their sector's data. Both the page fields and the ECC fields immediately follow the unit fields. Again, the end result is the same as in the previous embodiments—larger ECC and larger page fields compared to prior art systems using the same memory devices.

Many other arrangements are also possible—the unit fields may be larger than in prior art systems (unlike in all the above embodiments), the control fields may follow the sectors data, the control fields may be scattered in a few locations within the page, etc. There is absolutely no importance to the exact location of the individual fields or data sectors within the page. What counts is only the number of bytes allocated to the various types of control fields. The advantages of the present invention are not the result of any specific structure, but of the fact that space wasted in prior art systems is put to good use in this invention.

The present invention also is applicable where the flash memory is highly reliable, and therefore no ECC is used. In such case no reliability improvement is provided by this invention, but flash management efficiency improvement is obtained.

Figure 2:
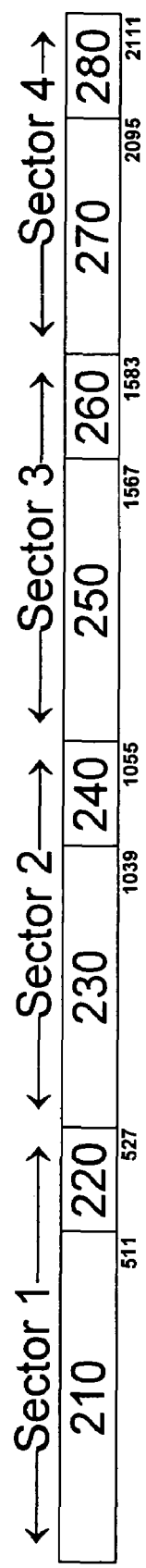

In prior art systems, such as those illustrated in FIGS. 2 and 3, the following relation must be kept:

(number of bytes in a sector+number of bytes in ECC field of a sector+number of bytes in page fields of a sector+number of bytes in unit fields of a unit)×(number of sectors in a page)<=number of bytes in a page In systems of the present invention, such as those illustrated in FIGS. 5, 6 and 7, this is replaced by:

(number of bytes in a sector+number of bytes in ECC field of a sector+number of bytes in page fields of a sector)×(number of sectors in a page)+(number of bytes in unit fields of a unit)
<=number of bytes in a page This last relation is less limiting than the prior art relation, thus providing for the larger field sizes presented above.

It should be noted that even though the current invention provides for a more efficient utilization of storage space, it may still be the case that some space is wasted. For example, for pages that are not the first ones in their units, there is no need for unit fields so that the corresponding space in all pages except the first is wasted in practice.

Also, the present invention is applicable to all types of flash memory architectures. The present invention may be implemented within a dedicated controller, such as an MMC or SD card controller. The present invention also may be implemented within a software driver running on the same CPU on which applications utilizing the memory are running.

Figure 1:
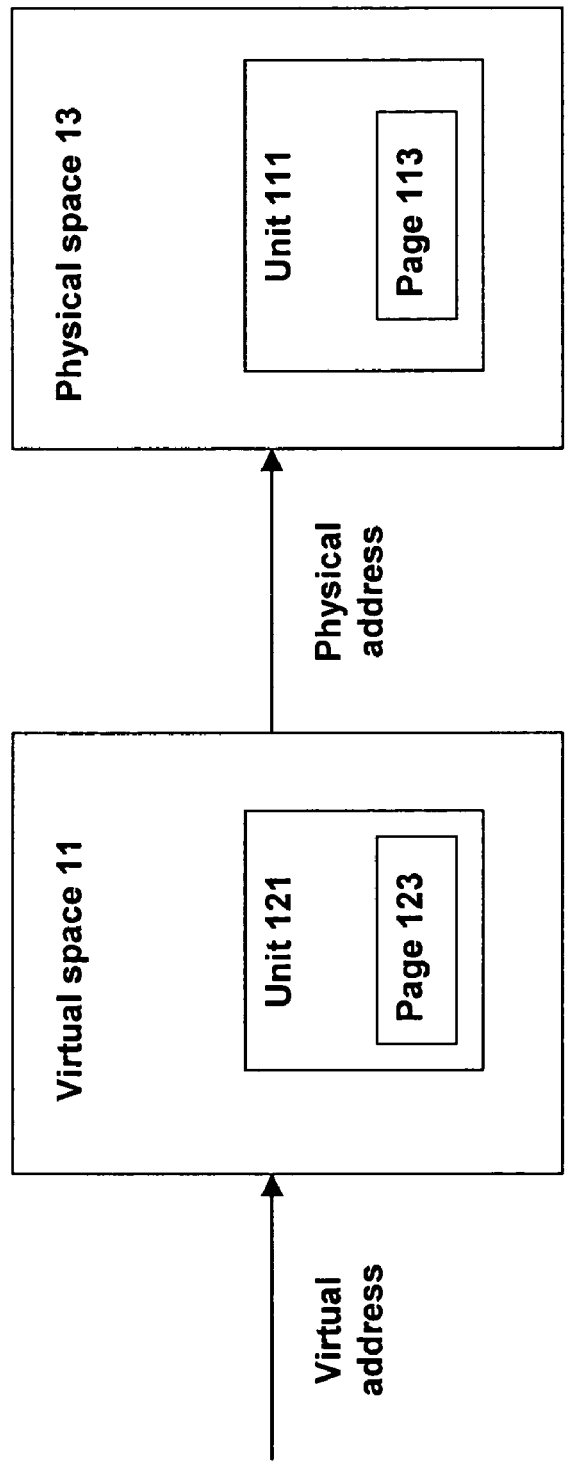
FIG. 1 illustrates virtual to physical address translation in a flash file system according to the prior art.
Figure 8:
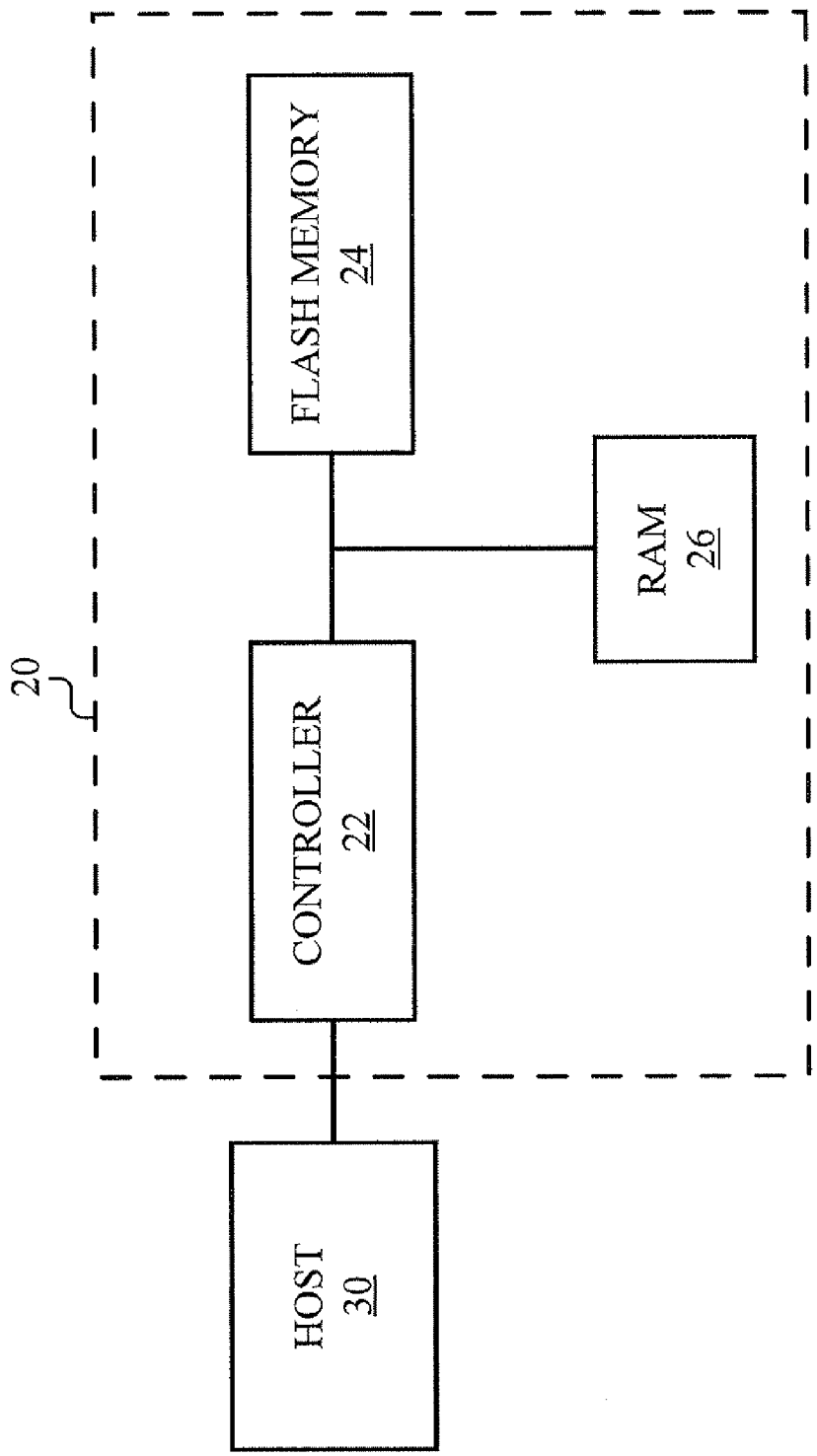
FIG. 8 is a high-level block diagram of a flash memory device of the present invention.

FIG. 8 is a high-level block diagram of a flash memory device 20 of the present invention, coupled to a host 30. FIG. 8 is adapted from FIG. 1 of Ban, U.S. Pat. No. 5,404,485. Flash memory device 20 includes a flash memory 24, a controller 22 and a random access memory (RAM) 26. Controller 22, that corresponds to "flash control 14" of U.S. Pat. No. 5,404,485, manages flash memory 24, with the help of RAM 26, as described in U.S. Pat. Nos. 5,404,485 and 5,937,425. Controller 22 also partitions the pages of flash memory 24 among user data areas and control data areas as described above.

Figure 9:
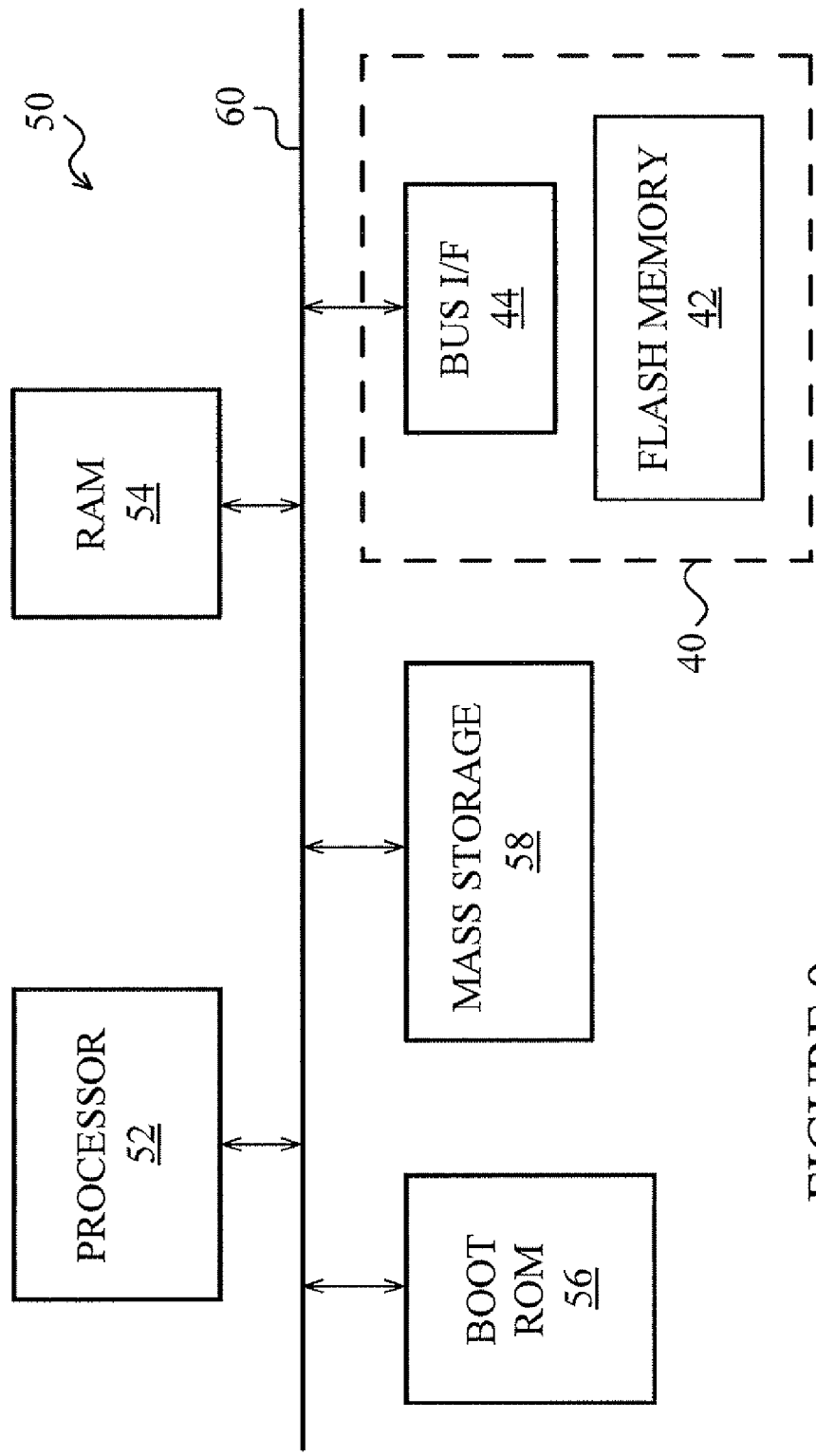
FIG. 9 is a high-level partial block diagram of a data storage system of the present invention.

FIG. 9 is a high-level partial block diagram of an alternative data storage system 50 of the present invention. Data storage system 50 includes a processor 52 and four memory devices: a RAM 54, a boot ROM 56, a mass storage device (hard disk) 58 and a flash memory device 40, all communicating via a common bus 60. Like flash memory device 20, flash memory device 40 includes a flash memory 42. Unlike flash memory device 20, flash memory device 40 lacks its own controller and RAM. Instead, processor 52 emulates controller 22 by executing a software driver that implements the methodology of U.S. Pat. Nos. 5,404,485 and 5,937,425 in the manner e.g. of the TrueFFS™ driver of M-Systems Flash Disk Pioneers Ltd. of Kfar Saba, Israel, and that also implements the partitioning of the pages of flash memory 42 in the manner of the present invention. Flash memory device 40 also includes a bus interface 44 to enable processor 52 to communicate with flash memory 42.

Figure 10:
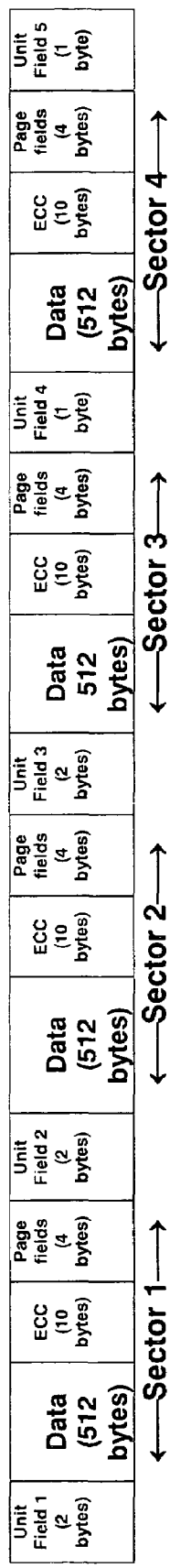

The description above relates to preferred embodiments of the present invention. FIG. 10 illustrates a less preferred embodiment that, nevertheless, is within the scope of the present invention. FIG. 10 is similar to FIG. 5, the difference being that the unit fields, rather than being contiguous in a single user field area, are interleaved with the sector-related field areas. Specifically, there are five discontiguous unit fields, and so in effect five discontiguous unit field areas. Following Gonzalez et al., the five unit fields are:

Unit physical address (two bytes)
Unit logical address (two bytes)
Number of times the unit has been erased (two bytes)
Programming voltage for the cells of the unit (one byte)
Erase voltage for the cells of the unit (one byte)

Figure 11:
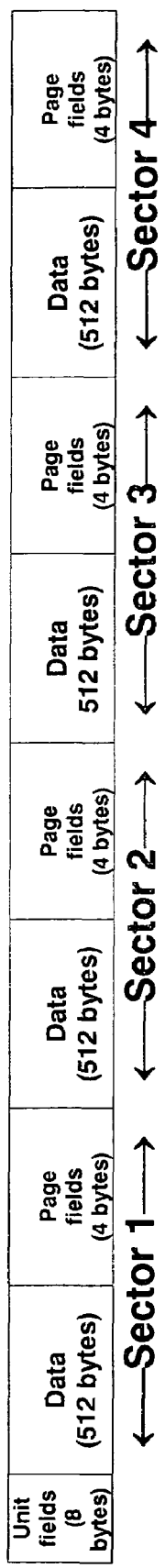
Figure 13:
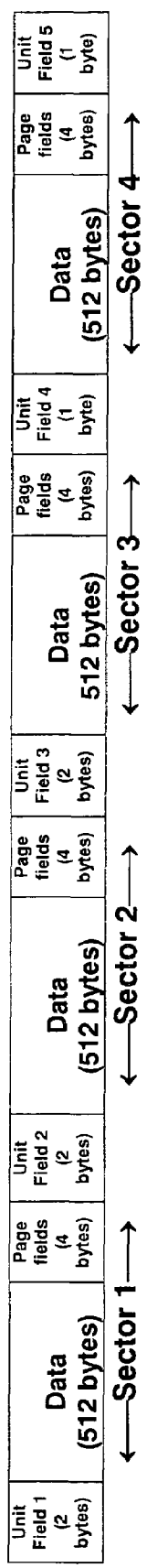

The scope of the present invention also includes pages without sector data fields such as ECC fields. FIGS. 11-13, that correspond to FIGS. 5, 6 and 10 only without ECC fields, illustrate such page layouts.

While the invention has been described with respect to a limited number of embodiments, it will be appreciated that many variations, modifications and other applications of the invention may be made.

What is claimed is:

1. A method of managing storage of user data in a memory, comprising the steps of:
   (a) providing the memory with at least one unit having at least one page with sufficient storage space to store both a plurality of sectors of the user data and overhead data related to said sectors; and
   (b) for at least one said page, partitioning said storage space among:
      (i) for each said sector, a corresponding user data area, and
      (ii) at least one unit field area, each said unit field area including at least one unit field, for at least one said unit field there being, in said partitioned storage space, fewer instances of said one unit field than said user data areas.

2. The method of claim 1, wherein, for each said at least one page, for each said unit field, there are, in said storage space of said each page, fewer instances of said each unit field than there are sectors in said each page.

3. The method of claim 1, wherein, for each said at least one page, said storage space of said each page includes a single said unit field area.

4. The method of claim 1, wherein said storage space also includes:
   (iii) for each said sector, a corresponding sector field area.

5. The method of claim 4, wherein said sector field areas are interleaved with said user data areas.

6. The method of claim 4, wherein said sector field areas are contiguous.

7. The method of claim 4, wherein said storage space also includes:
   (iv) for each said sector, a corresponding sector data field area.

8. The method of claim 7, wherein said sector field areas and said sector data field areas are interleaved with said user data areas.

9. The method of claim 7, wherein said sector field areas are contiguous and said sector data field areas are interleaved with said user data areas.

10. The method of claim 7, wherein said sector field areas and said sector data field areas are contiguous.

11. The method of claim 1, wherein at least one said unit has a plurality of said pages, and wherein said storage space of only a portion of said pages of said plurality is partitioned.

12. The method of claim 11, wherein said storage space of only one said page of said plurality is partitioned.

13. A memory device comprising:
   (a) a memory; and
   (b) a controller for managing storage of user data in said memory according to the method of claim 1.

14. A system for storing data, comprising:
   (a) a memory device; and
   (b) a processor operative to manage storage of user data in said memory device according to the method of claim 1.

15. A method of managing storage of user data in a memory, comprising the steps of:
   (a) providing the memory with at least one unit having at least one page with sufficient storage space to store both a plurality of sectors of the user data and overhead data related to said sectors; and (b) for at least one said page:
  (i) including, in said overhead data of said sectors that are stored in said page, at least one unit datum, and
  (ii) storing said at least one unit datum in said storage space of said page, there being fewer instances of at least one of said at least one unit datum stored in said storage space of said page than there are said sectors in said page.

16. The method of claim 15, wherein, for each said at least one page, fewer instances of every said at least one unit datum are stored in said storage space of said each page than there are said sectors in said each page.

17. The method of claim 16, wherein, for each said at least one page, only one instance of each said unit datum is stored in said storage space of said each page.

18. The method of claim 15, wherein at least one said unit has a plurality of said pages, and wherein said at least one unit datum is included in said overhead data and stored in said storage space of only a portion of said pages of said plurality.

19. The method of claim 18, wherein said at least one unit datum is included in said unit data and stored in said storage space of only one page of said plurality.

20. A memory device including:
  (a) a memory; and
  (b) a controller for managing storage of user data in said memory according to the method of claim 15.

21. A system for storing data, comprising:
  (a) a memory device; and
  (b) a processor operative to manage storage of user data in said memory device according to the method of claim 15.

22. A method of managing storage of user data in a memory, comprising the steps of:
  (a) providing the memory with at least one unit having at least one page with sufficient storage space to store both a plurality of sectors of the user data and overhead data related to said sectors; and
  (b) for at least one said page, partitioning said storage space of said page among:
    (i) for each said sector of said page, a corresponding user data area, all said user data areas having a common user data area size,
    (ii) for each said sector of said page, a corresponding sector field area, all said sector field areas having a common sector field area size,
    (iii) for each said sector of said page, a corresponding sector data field area, all said sector data field areas having a common sector data field area size, and
    (iv) at least one unit field area having a unit field area size;
    wherein a size of said storage space of said page is less than a product of a number of said sectors of said page with a sum of said sizes.

23. The method of claim 22, wherein at least one said unit has a plurality of said pages, and wherein said storage space of each page of only a portion of said pages of said plurality is partitioned among said user data areas, said sector field areas, said sector data field areas and said at least one unit field area, and said storage space of each page of a remainder of said pages of said plurality lacks any said unit field area.

24. The method of claim 23, wherein said storage space of only one said page of said plurality is partitioned among said user data areas, said sector field areas, said sector data field areas and said at least one unit field area.

25. A memory device including:
  (a) a memory; and
  (b) a controller for managing storage of user data in said memory according to the method of claim 22.

26. A system for storing data, comprising:
  (a) a memory device; and
  (b) a processor operative to manage storage of user data in said memory device according to the method of claim 22.

27. A method of managing storage of user data in a memory, comprising the steps of:
  (a) providing the memory with at least one unit having at least one page with sufficient storage space to store both a plurality of sectors of the user data and overhead data related to said sectors; and
  (b) for at least one said page, partitioning said storage space of said page among:
    (i) for each said sector of said page, a corresponding user data area, all said user data areas having a common user data area size,
    (ii) for each said sector of said page, a corresponding sector field area, all said sector field areas having a common sector field area size, and
    (iii) at least one unit field area having a unit field area size;
    wherein a size of said storage space of said page is less than a product of a number of said sectors of said page with a sum of said sizes.

28. The method of claim 27, wherein at least one said unit has a plurality of said pages, and wherein said storage space of each page of only a portion of said pages of said plurality is partitioned among said user data areas, said sector field areas and said at least one unit field area, and said storage space of each page of a remainder of said pages of said plurality lacks any said unit field area.

29. The method of claim 28, wherein said storage space of only one said page of said plurality is partitioned among said user data areas, said sector field areas and said at least one unit field area.

30. A memory device including:
  (a) a memory; and
  (b) a controller for managing storage of user data in said memory according to the method of claim 27.

31. A system for storing data, comprising:
  (a) a memory device; and
  (b) a processor operative to manage storage of user data in said memory device according to the method of claim 27.

* * * * *